Figure 4:
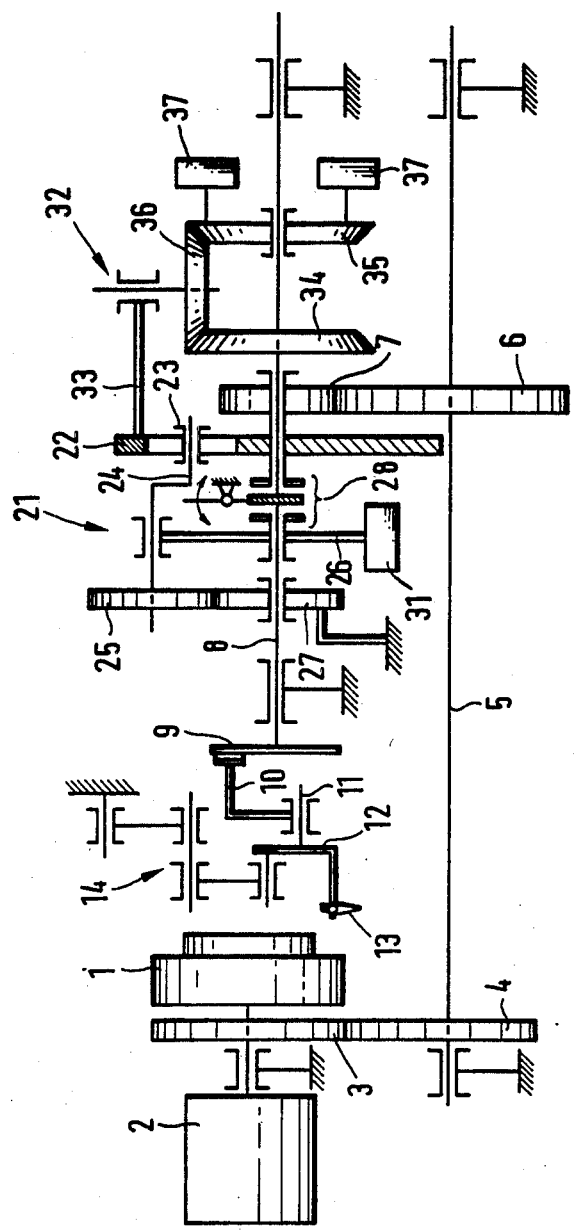

United States Patent [19]

Ley et al.

[11] Patent Number: 4,648,295
[45] Date of Patent: Mar. 10, 1987

[54] METHOD FOR PRODUCING WORKPIECES HAVING POLYGONAL OUTER AND/OR INNER CONTOURS AND APPARATUS FOR IMPLEMENTING THE METHOD

[76] Inventors: Hans Ley, Dr. Wirtz-Str. 3, D-5203 Much; Udo Neumöck, Hermann-Krausen-Str.41; Scholz, Peter, Heinrich-Hoerle-Str. 4, both of D-5000 Köln 60; Seidler, Horst, Heckhaus 40, D-5203 Much; Horst Berghaus, Steinenbrückerstr. 1, D-5200 Lindlar 3; Manfred Schmidt, Krahmerweg 11, D-5203 Much, all of Fed. Rep. of Germany

[21] Appl. No.: 589,100
[22] PCT Filed: Jun. 18, 1983
[86] PCT No.: PCT/EP83/00159
§ 371 Date: Feb. 17, 1984
§ 102(e) Date: Feb. 17, 1984
[87] PCT Pub. No.: WO84/00018
PCT Pub. Date: Jan. 5, 1984

[30] Foreign Application Priority Data

Jun. 19, 1982 [DE] Fed. Rep. of Germany ....... 3222991

[51] Int. Cl.⁴ ............................ B23B 1/00; B23B 5/44
[52] U.S. Cl. .......................................... 82/18; 82/1.3; 51/90; 51/97 NC
[58] Field of Search ...................... 82/18, 2 B, 19, 1.3, 82/1 C; 51/90, 97 NC, 33 W

[56] References Cited

U.S. PATENT DOCUMENTS

| | | | |
|---|---|---|---|
| 2,909,010 | 10/1959 | Zelewsky | 82/18 |
| 3,080,795 | 3/1963 | Shultz . | |
| 3,593,603 | 7/1971 | Gellert | 82/18 |
| 3,595,108 | 7/1971 | Priscsak | 82/18 |
| 3,812,746 | 5/1974 | Saari | 82/18 |
| 3,886,693 | 6/1975 | Tajnafoi et al. | 51/97 NC |
| 3,916,738 | 11/1975 | Neubrand | 82/18 |
| 3,958,471 | 5/1976 | Muller | 82/18 |
| 4,124,927 | 11/1978 | Sorenson | 82/18 |
| 4,141,278 | 2/1979 | Lieser | 82/18 |

FOREIGN PATENT DOCUMENTS

| | | |
|---|---|---|
| 222861 | 6/1910 | Fed. Rep. of Germany . |
| 506943 | 9/1930 | Fed. Rep. of Germany . |
| 513327 | 11/1930 | Fed. Rep. of Germany . |
| 680311 | 8/1939 | Fed. Rep. of Germany . |
| 708743 | 7/1941 | Fed. Rep. of Germany . |
| 1012802 | 7/1957 | Fed. Rep. of Germany . |
| 1050149 | 2/1959 | Fed. Rep. of Germany . |
| 2357005 | 7/1974 | Fed. Rep. of Germany . |
| 862890 | 3/1941 | France . |
| 933254 | 4/1948 | France . |
| 1531602 | 7/1968 | France . |
| 2223120 | 10/1974 | France . |
| 90203 | 7/1980 | Japan .................... 82/18 |
| 274321 | 7/1951 | Switzerland . |
| 330925 | 8/1958 | Switzerland . |
| 738771 | 6/1980 | U.S.S.R. . |

Primary Examiner—Lowell A. Larson
Assistant Examiner—Jerry Kearns
Attorney, Agent, or Firm—Spencer & Frank

[57] ABSTRACT

Method for producing workpieces having polygonal outer and/or inner contours, preferably by machining, wherein the workpiece to be machined rotates at a constant speed about a stationary axis, while the tool is guided on a closed, curved path, with the rate of rotation of the workpiece and the speed at which the tool revolves on its curved path being dependent upon one another and wherein further the tool engages at the workpiece during the entire revolution. The traveling speed of the tool during one revolution is varied according to a law of motion which is defined by the stationary rotation of the workpiece, the path of movement of the tool and the desired polygonal contour. The tool is guided, preferably translatorily, on a circularly cylindrical path.

28 Claims, 14 Drawing Figures

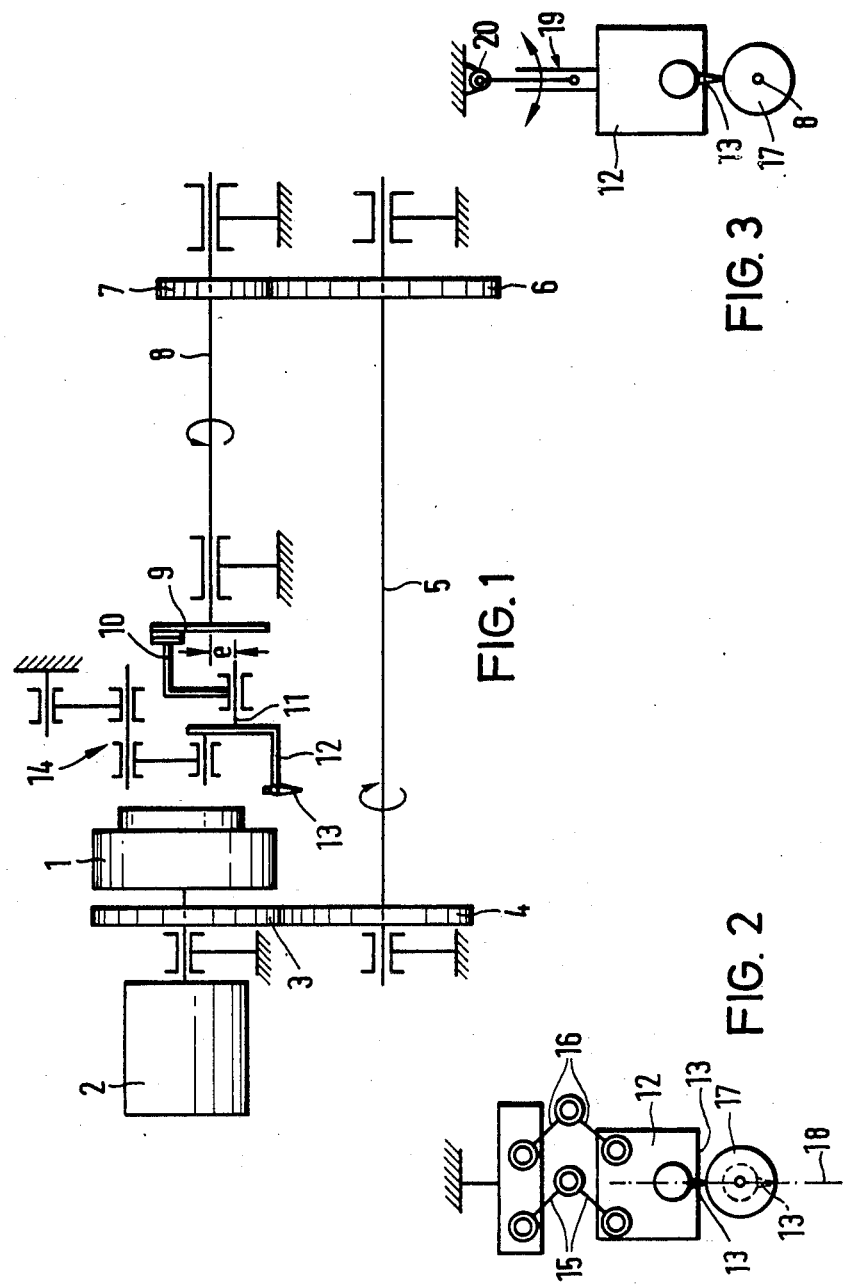

METHOD FOR PRODUCING WORKPIECES HAVING POLYGONAL OUTER AND/OR INNER CONTOURS AND APPARATUS FOR IMPLEMENTING THE METHOD

The invention relates to a method for producing workpieces having polygonal outer and/or inner contours preferably by machining, with the workpiece to be processed rotating at a constant rate around a stationary axis while the tool is guided on a closed curved path. The rate of rotation of the workpiece and the circumferential speed of the tool on its curved path are dependent upon one another and the tool is in engagement with the workpiece during the entire revolution.

DE-OS No. 2,355,036 discloses a method of the abovementioned type in which the tool is guided on an elliptical path with respect to the workpiece. By superposing the rotating motion of the workpiece and the movement of the tool traversing an elliptical path, corresponding polygonal structures can be produced, even those having sharply drawn corners. When reduced to practice, the known process has resulted in drawbacks, for example a considerable reduction of the operating speeds since the gear mechanisms for generating the elliptical movement of the tool permit only limited numbers of revolutions. A further drawback of the prior art method is that the gear mechanisms required to generate the law of motion must be designed to be relatively large and, consequently, the production of polygons having different diameters requires a step-down lever arrangement which is difficult to accomplish with the necessary rigidity.

It is now the object of the invention to provide a method which permits greater operating speeds and a larger number of possible variations.

This is accomplished according to the invention in that the traveling speed of the tool during its revolution is changed according to a law of motion which is determined by the in-place rotation of the workpiece, the path of movement of the tool and the desired polygonal contour. This method has the advantage that the superpositions required to generate the polygonal contours are effected—instead of by superposition of a circular movement directly at the tool and a different path traversed by the tool—by a respective change in the rate of movement of the tool guided on a circular path. This offers considerable advantages for practical construction.

In a preferred embodiment of the method it is provided that the tool is guided essentially in a translatory manner on a circular path which is eccentric to the rotation axis of the workpiece. Such guidance of the tool offers not only defined engagement conditions between workpiece and tool but also permits in a simple manner the compensation of mass forces and results in a much more compact and thus more rigid design which produces workpieces with greater precision. The circular path here is tangent on the incircle and on the circumcircle of the profile to be produced.

In another embodiment of the method, it is provided that the tool rotates on a circular path which is eccentric to the axis of rotation of the workpiece and encloses it, the circle again being tangent on the incircle and on the circumcircle of the profile. This results in reduced tool speeds and more favorable pressure angles for the tool. It is advantageous for the tool to be guided on a circularly cylindrical path since it is then possible to also use tools having a large cutting width, for example grinding wheels. According to this method, cross-sectional contours having an approximately elliptical cross section or a "triangular" cross section can be produced in the manner of a so-called "constant diameter member". In view of the great accuracy in dimensions that can be realized, such cross-sectional contours can be used, for example, for plug-in connections in shafts or the like. The shape of the contour is here determined by the ratio of the number of revolutions of the tool to the number of revolutions of the workpiece, hereinafter called the speed ratio.

While in the above-described method, an influence on the polygonal contour depends essentially only on the speed ratio between workpiece and tool and the diameter of the tool path, and no polygonal contours having linear side faces can be produced, the invention provides measures for generating the law of motion for the above-described method, particularly for the method according to the invention, according to which the tool is guided on a circular path. In one embodiment of the invention, these measures reside in that the traveling speed of the tool during one revolution is varied according to a law of motion which corresponds to the angular velocity of the center point of a circle that, without sliding, rolls over the outside of a fixed circle having the same diameter, with the angular velocity being taken with reference to the center point of the fixed circle and a second point which is permanently associated with the revolving circle and which describes a Pascal curve during the revolution of the rolling circle is guided at essentially constant angular velocity around a pivot point lying within the Pascal curve.

In another embodiment of the invention, the measures reside in that the traveling speed of the tool during one revolution is varied according to a law of motion which corresponds to the angular velocity of the axis of rotation of a crank arm which itself rotates on a circular path at a greater angular velocity but in the same sense of rotation, with the angular velocity of the revolution of the axis of rotation on the circular path depending on the angular velocity of the rotation of the axis of rotation itself and the crank pin is driven by a crank guide rotating at a constant angular velocity, the axis of rotation of the crank guide coinciding with the axis of rotation of the circular path of the axis of rotation of the crank arm.

These methods have the advantage that any desired polygonal contours can be produced by giving the corresponding Pascal curve, on the one hand, and giving the speed ratio, on the other hand. Giving the rotation speed ratio determines the "number of corners", while giving the Pascal curve fixes the shape of the contour as a whole, for example sharply defined corners, plane or curved side faces, etc. These methods can also be used if the path of the tool does not correspond to a circular path. The axes of rotation of crank arm and crank guide may be placed in a spaced, parallel arrangement.

The law of motion may be developed by the programmable electronic control of a drive for generating the tool revolutions, in which a corresponding Pascal curve and the speed ratio are given.

In a preferred embodiment of the invention it is provided that the revolution rate of the tool during one revolution on its path is varied by means of a gear mechanism controlled according to Pascal curves. This method has the advantage that without changing the path of the tool—except for setting the diameter of the circular path—the desired polygonal structure can be set merely by varying the travel speed of the tool during one revolution. In this way, it is possible to generate polygons having sharply defined corners, with the side faces being planar or curved, or the polygons may have rounded corners or asymmetrically contoured side faces. Due to the fact that the law of motion is generated mechanically, great precision can be realized since there is practically no slip between workpiece movement and tool movement.

In a preferred embodiment of the invention, it is provided that in order to vary the travel speed of the tool, a rotating crank guide is employed which is coupled with a epicyclic gear mechanism and is driven at a constant rate of rotation that is adapted to the rate of rotation of the workpiece and the rotational movement of the tool is picked up from the planet wheel.

In a preferred further embodiment of the method according to the invention it is provided that, for the production of asymmetrical polygonal contours, the feed axis and the overlap position of the crank guide of the epicyclic gear are set at an angle to one another. The term feed axis is understood to mean the connecting line between the points of contact of the circle described by the cutting edge of the tool with the incircle and the circle described around the polygonal contour to be produced. The "overlap position" is defined by the polar axis of the given Pascal curve. As long as the feed axis and the axis defined by the overlap position lie in one plane, symmetrical polygonal contours result while an angular position between feed axis and overlap position results in polygonal contours having asymmetrical side faces. For a definition of this plane it is assumed that the feed axis and the axis of the overlap position are oriented parallel to one another.

In another embodiment it is provided that the law of motion is derived from the travel speed of a point which travels on an elliptical path at a constant angular velocity. Here it is of particular advantage if the travel speed of the tool during one revolution is varied according to a law of motion which corresponds to a whole number multiple of the angular velocity of the axis of rotation of a crank arm, with the axis itself rotating on a circular path of the same angular velocity but in the opposite direction of rotation, and the angular velocity of the revolution of the axis of rotation on the circular path depending on the angular velocity of the rotation of the axis of rotation itself. The crank pin is driven by a crank guide rotating at a constant angular velocity, with the axis of rotation of the crank guide being the axis of rotation of the circular path of the axis of rotation of the crank arm.

The invention further relates to an apparatus for producing workpieces having polygonal outer and/or inner contours particularly by machining, the apparatus including a rotatably mounted, driven workpiece mount and a tool which is movably guided along a closed, curved path and is in communication with the drive of the workpiece mount.

According to the invention, it is provided that the tool is held in a tool holder which is held by means of a bearing block against a rotating carrier eccentric to the axis of rotation of the carrier so as to be rotatable relative to the carrier and is supported on the machine frame by means of a moment transmitting support. This arrangement permits a very compact and thus rigid design which assures very accurate dimensions and precision in the resulting workpieces. A further advantage of this structure according to the invention is that the setting of the desired workpiece diameters can be simplified greatly in a structural respect without there being any change in the rigidity inherent in the structure, since the tool can be set with respect to the workpiece by a radial adjustment. In a preferred embodiment of the invention, it is provided in this connection that, in order to set the degree of eccentricity, the bearing block is mounted to be radially displaceable and fixable on the carrier. In this way, the longitudinal spacing between the tool tip on the one hand and the bearing [on the other hand] is kept constant over the entire given diameter range.

In a preferred advantageous embodiment, it is provided that the tool holder and the moment transmitting support form a crank drive, particularly a parallel crank drive. The configuration as parallel crank drive has the advantage that all points of the tool holder describe the same circular curve so that the point of engagement of the tool with respect to the tool holder can be placed as desired. This is of significance, for example, for work in a grinding process because of the relatively large dimensions of the grinding stone. Since, moreover, the circular curve is part of a circularly cylindrical surface, any desired grinding stone width can be used. This also applies to the use of milling cutters or facing heads or tools having similar geometric configurations, such as rollers or the like. The parallel crank drive may be designed either as a double crank drive or, advantageously, as a single crank with parallel guide as moment trasnmitting support.

In an advantageous embodiment of the invention it is provided that the gear ratio between the rate of rotation of the workpiece mount and the rate of rotation of the carrier for the tool holder can be set by a gear mechanism. In a preferred embodiment particularly of the above-described device with guidance of the workpiece on a circular path, the invention additionally provides that the carrier for the tool holder is in communication with the drive or the step-up gear, respectively, for setting the speed ratio between workpiece and tool by means of a gear mechanism controlled according to Pascal curves. In a particularly expedient embodiment it is here provided that the gear mechanism controlled according to Pascal curves is formed by an epicyclic gear including a crank guide which is connected with the planet wheel by means of a crank pin. The crank guide forms the driving part of the gear mechanism and the web of the planet wheel forms the driven part which is connected with the shaft of the carrier for the tool holder, the axis of rotation of the carrier being identical with the axis of rotation of the web. With the aid of such a drive, it is easy to generate the respective law of motion for the tool as defined by Pascal curves A further advantage of this type of gear structure is that it operates practically without play which forms a basis for great precision. This also applies to the connection between crank guide and crank pin since here, due to the rotary motion of the crank guide, the crank pin rests only against one side of the crank guide during the entire revolution.

In a preferred embodiment of the invention it is provided that the defined feed axis of the movement of the tool and the overlap position of crank guide and planet wheel lie in one plane and that the overlap position of the crank guide with respect to the feed axis can be set at an angle thereto. If feed axis and overlap position lie in one plane, symmetrical polygonal contours result while with the setting of an angular position between overlap position and feed axis, polygonal contours result which have asymmetric sides.

According to a further embodiment of the invention, it is provided that the axis of rotation of the crank guide can be set to be eccentric with respect to the axis of rotation of the web. This results in a further, structurally easily realizable possible variation of the desired law of motion.

In an embodiment of the invention it is further provided that the crank pin associated with the planet wheel is designed to be displaceable and fixable with respect to the planet wheel. This measure as well results in structurally easily realized possible variations for the law of motion for the tool. If, for example, the axis of rotation of the crank guide is set to be eccentric to the axis of rotation of the web, with feed axis and overlap position lying in one plane, and if the crank pin is radially shifted and fixed on the planet wheel in such a manner that it coincides with the center point of the planet wheel, a polygon results which has rounded corners and, depending on the set eccentricity of the tool on the carrier, has outwardly curved side faces, i.e. a contour which approximately corresponds to the contour of a constant diameter member, if a rotation rate ratio of 3:1 is set.

In a preferred embodiment of the invention, a coupling is provided through which the carrier for the tool holder is separated from the web of the planet wheel and can be connected with the drive shaft for the crank guide. This makes it possible to switch the device from a law of motion given by Pascal curves to a law of motion fixed solely by the eccentricity of the circular path of the tool with respect to the rotary movement of the tool and the speed ratio between tool and workpiece.

In a further embodiment of the invention it is further provided to drive the pole wheel of the epicyclic gear additionally in dependence on the workpiece feed. If the advancing movement of the tool, which is present in any case, is superposed for this purpose, it is possible to provide a workpiece with a helix, which has a corresponding polygonal contour.

In a further embodiment, the invention provides that for the equalization of mass moments of inertia, developed due to the changing travel speed of the tool within one revolution, the control drive is connected with a differential gear which drives a centrifugal mass. It is here preferably provided that the differential gear for driving the centrifugal mass to equalize mass moments of inertia is a planetary gear, with the crank guide driving the planet gear carrier, the sun gear bearing connected with the shaft of the carrier for the tool holder and the countergear, which is in engagement with the planet gear, is mounted coaxially with the sun gear and supports the centrifugal mass.

In a further advantageous embodiment of the invention, it is provided that the axis of rotation of the carrier for the tool holder can be adjusted at an angle with respect to the axis of rotation of the workpiece. This embodiment permits not only the production of conical workpieces having polygonal outer contours, but additionally also the development of corresponding polygonal contours in the frontal face of a rotating workpiece, if the two axes are set at an angle of 90° to one another.

In one embodiment of the invention, a further advantageous device for generating the law of motion is characterized in that the driven shaft of the crank is mounted in a bearing bush which is arranged to be eccentric with respect to the axis of rotation of the crank crank guide and rotates in the same direction, that the bearing bush is connected with the driven shaft of the crank by means of a setp-up gear and that the driven shaft is in direct communication with the rotatably mounted tool carriers.

Figure 5:
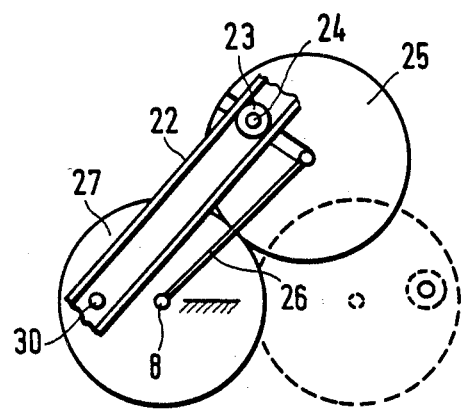
Figure 6:
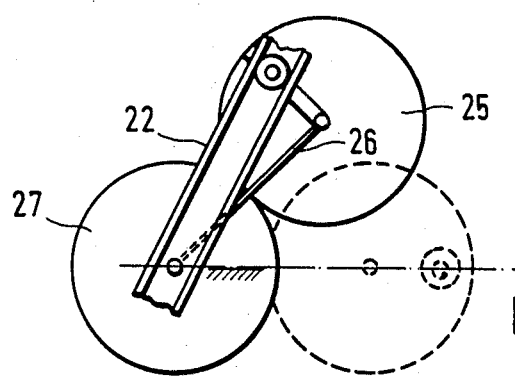
Figure 7:
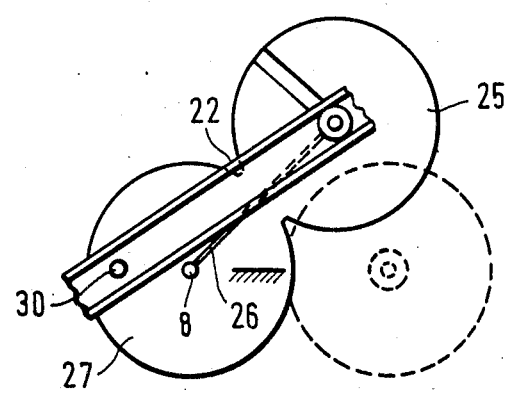
Figure 8:
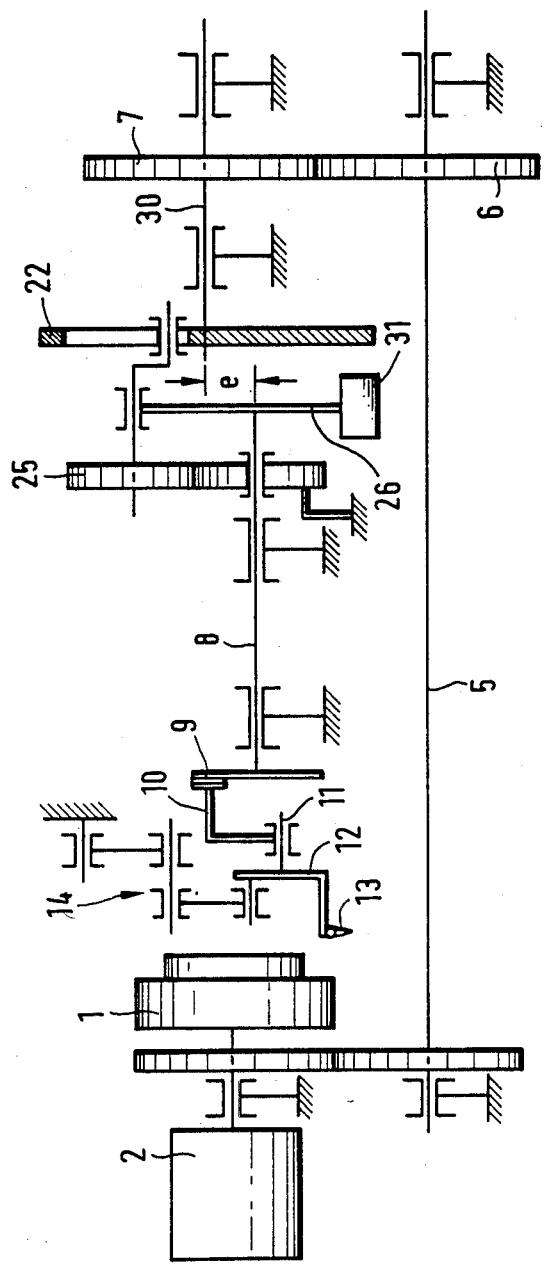
Figure 10:
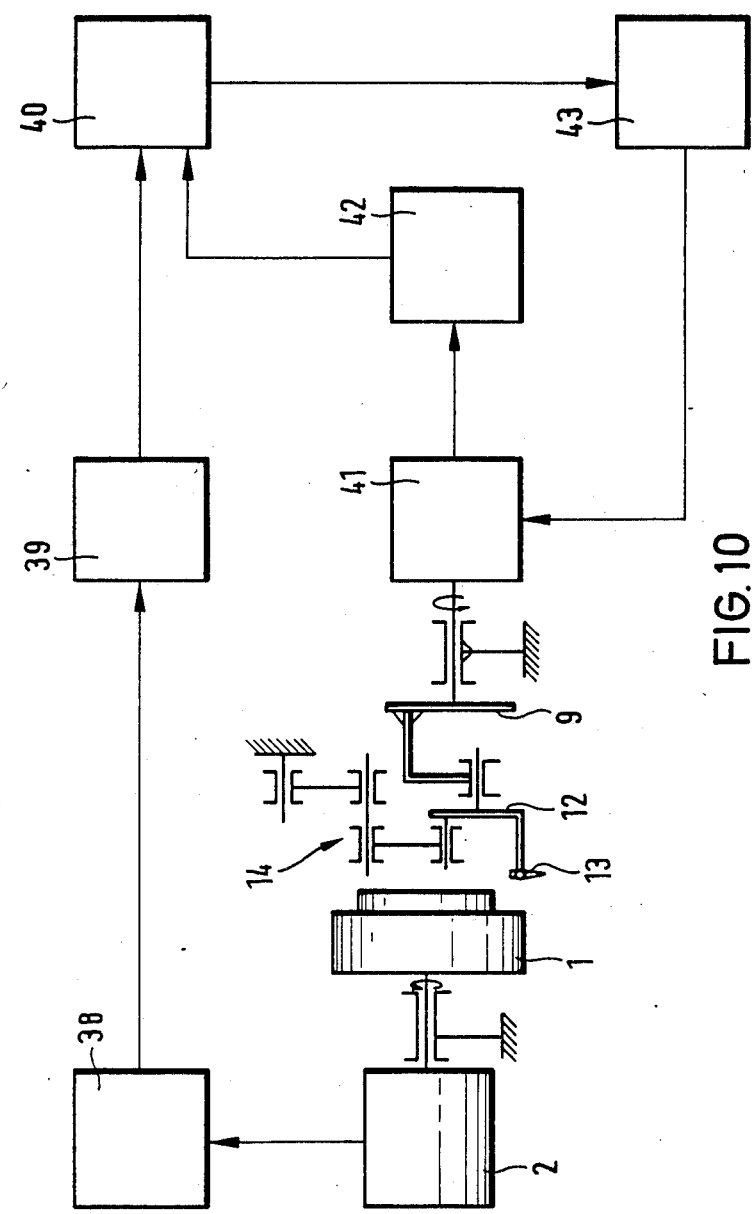
Figure 11:
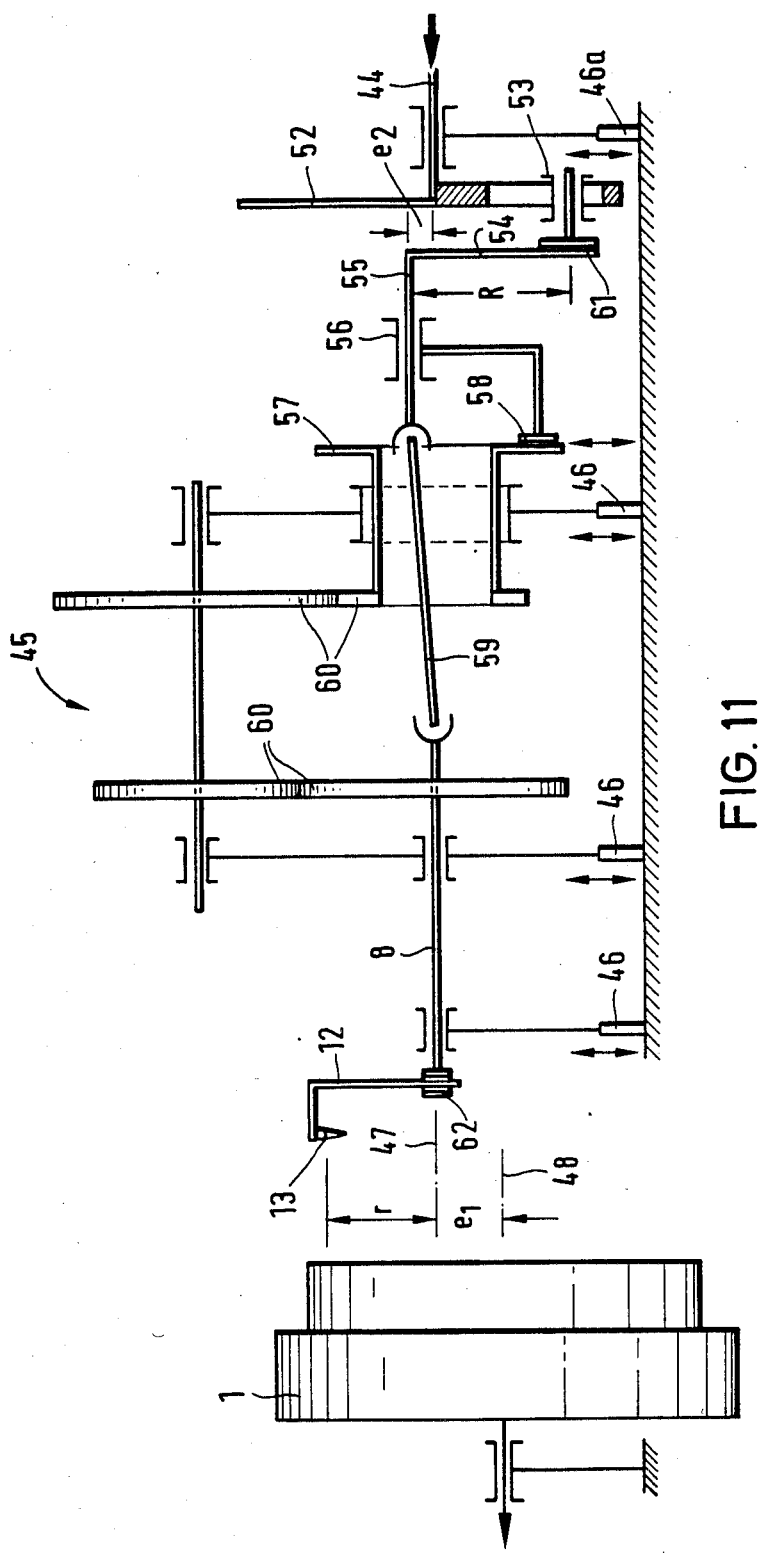
Figure 12:
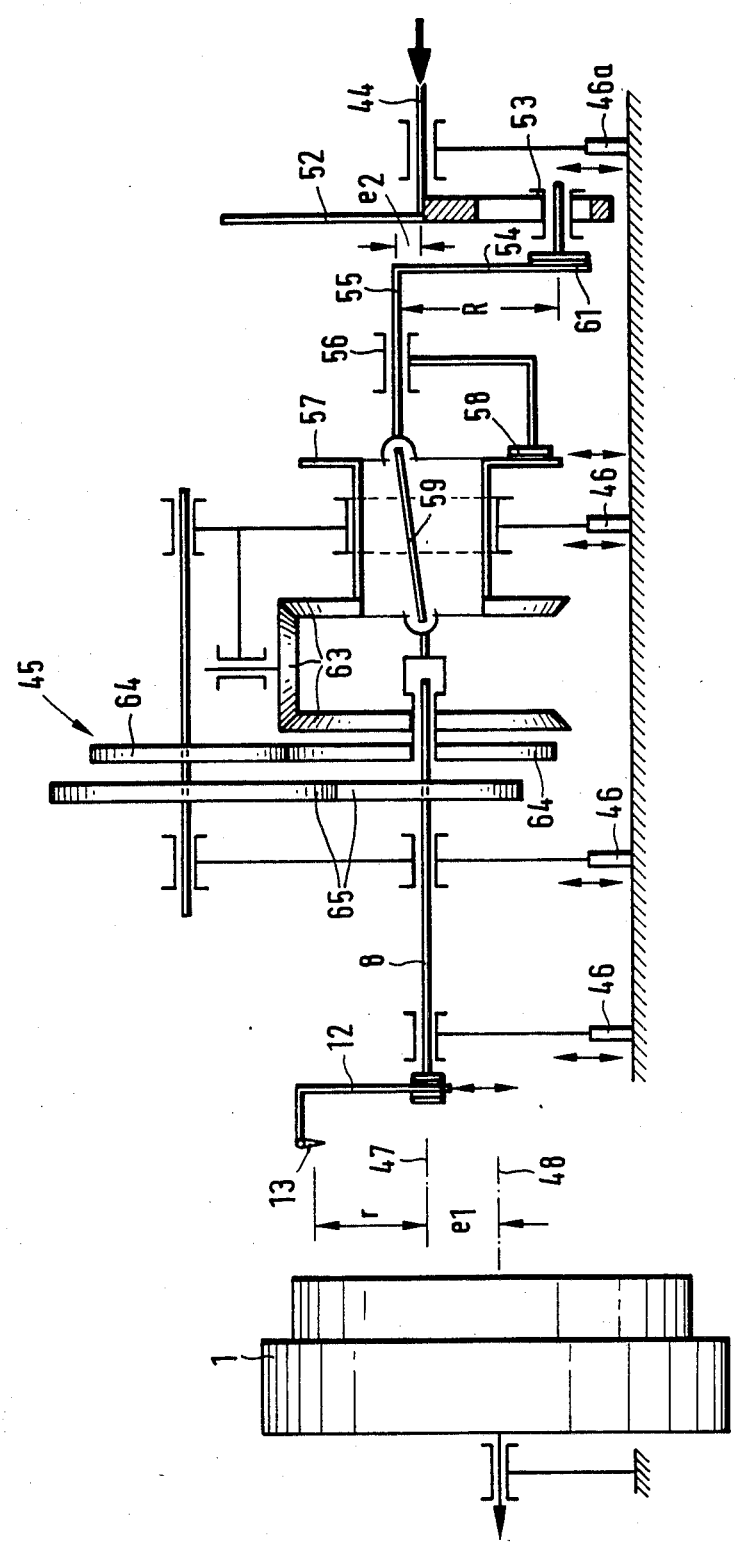
Figure 14:
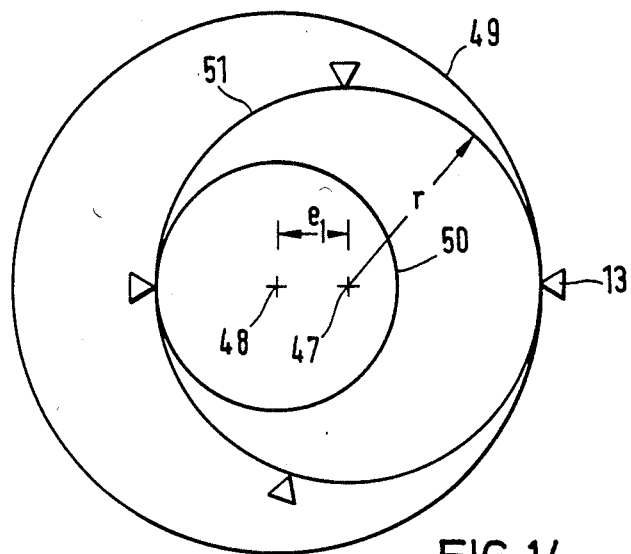
Figure 13:
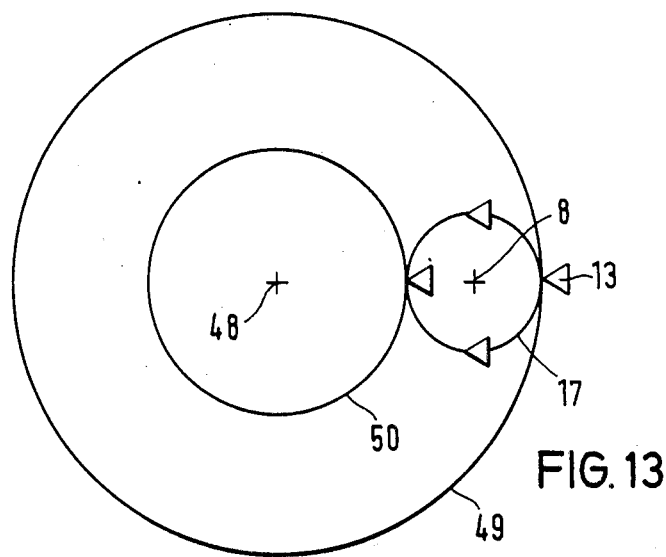

The invention will be explained in greater detail with the aid of schematic drawings of embodiments. It is shown in:

FIG. 1, a top view of a device including a tool holder which is guided translatorily on a circular path;

FIG. 2, a frontal view of the tool holder according to FIG. 1;

FIG. 3, a frontal view of a tool holder having a different guide;

FIG. 4, a top view of a device including a gear mechanism controlled by Pascal curves for generating the law of motion for the tool holder;

FIGS. 5, 6 and 7, frontal views of various possible settings of the gears for generating the law of motion;

FIG. 8, a top view of a device where the gears are set for generating the law of motion according to FIG. 5;

FIGS. 9a–h, polygonal contours generated with the devices according to FIG. 1 and FIG. 4, respectively;

FIG. 10, a block circuit diagram for an electronically controlled device;

FIG. 11, another embodiment of a gear mechanism controlled according to Pascal curves;

FIG. 12, an embodiment of a gear mechanism controlled according to an ellipse;

FIGS. 13, 14, the path of the tool tip with respect to the workpieces.

The apparatus shown schematically in FIG. 1 comprises a rotatably mounted workpiece mount 1 which is driven at a constant rate of rotation by means of a drive motor 2. A shaft 8 is driven by means of a pair of gears 3, 4, a countershaft 5 and a pair of gears 6, 7. The pairs of gears 3, 4 and 6, 7, respectively, may be designed as change gears or also as switchable gears, with the aid of which the speed ratio between the rate of rotation of the workpiece mount 1, on the one hand, and the number of revolutions of the tool, on the other hand, is given.

Shaft 8 is connected to a carrier 9 at which is disposed a radially displaceable and adjustable bearing block 10. A tool holder 12 to which a tool 13, for example a rotary chisel, is fixed in the usual manner, is mounted in bearing block 10 through the intermediary of a shaft 11. Depending on whether an internal contour or an external contour is to be machined, the tool tip is oriented radially outwardly or inwardly, respectively, in the direction toward the workpiece which is clamped into the workpiece mount 1.

By appropriately setting bearing block 10 on carrier 9, shaft 11 of tool holder 12 can be set to be eccentric to the rotation axis of carrier 9 and thus to shaft 8, so that, if carrier 9 rotates, shaft 11 and, thus also the tip of the tool, travel a circular path which has eccentricity e as its radius.

Tool holder 12 is now fixed to the machine member by means of a moment transmitting support 14 so that tool 13 performs a translatory circular movement with respect to the tip of the tool and tool holder 12 and moment transmitting support 14 constitute a crank drive.

FIGS. 2 and 3 are frontal views of two different embodiments of moment transmitting support 14. In the embodiment according to FIG. 2, the tool holder 12 is guided by parallel guides 15, 16 so that the tip of tool 13 travels the circular path 17 shown in the drawing. Here, the tip of tool 13 is always oriented parallel to the feed axis 18. All points here travel the same circular path.

In the embodiment according to FIG. 3, moment transmitting support 14 is formed by a pivot arm 19 which is guided linearly. In this embodiment as well, tool 13 is subjected to an essentially translatory circular movement since in the orders of magnitude under consideration here for the pivot angle, the rotation about articulation point 20 of pivot arm 19 as a result of the pivoting is negligible. The tool tip, however, should here be set in such a way that it lies on an extension of shaft 11 since otherwise it would not describe an exact circle.

Figure 9:
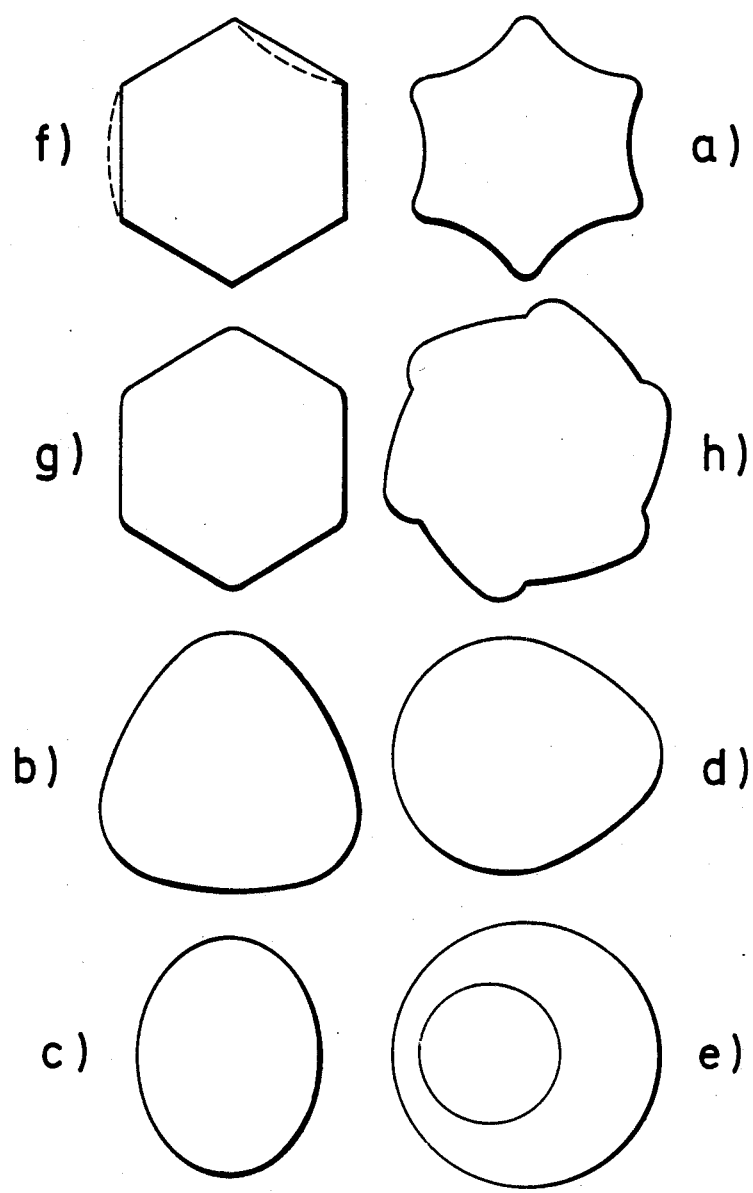

If the transmission ratio between the rate of rotation of workpiece mount 1 and the rate of rotation of carrier 9 is set accordingly and the eccentricity of tool holder 12 on support 9 is set to correspond, the device according to FIG. 1 permits the production of polygonal contours as shown in FIGS. 9a, b, c, d, and e. For example, for the polygonal contour according to FIG. 9c, the transmission ratio between workpiece and tool must be set at 1:2, i.e. the tool rotates twice as fast as the workpiece.

The device according to FIG. 1, as well as the devices according to FIGS. 4 and 8, which will be described below, are additionally provided with an advancing device (not shown in detail here) for tool 13 by means of which tool 13 can be displaced in the longitudinal direction, i.e. in the direction of the axis of rotation of tool mount 1, as this is known, for example, in lathes. Due to the structurally simple design of the driving and moving mechanism of the tool holder, the latter can be assembled as a compact structural unit on the support of a lathe so that it is merely necessary to provide a corresponding coupling for shaft 8 of the tool drive with the drive of the tool mount. Direction of rotation of tool mount 1 and shaft 8 and thus the path traveled by the tool are preferably set to be in the same sense of rotation.

The embodiment of FIG. 4 differs from the embodiment of FIG. 1 in that shaft 8 is additionally connected with a drive 21 which can be controlled by Pascal curves. In this embodiment, such a drive is formed by an epicyclic crank guide gear.

In this embodiment, gear 7 of the back gear is mounted to be freely rotatable on shaft 8 and is fixed to a drive crank guide 22. Through the intermediary of a roller 23, a crank pin 24 is in engagement with this drive crank guide and is radially adjustably and fixably connected with a planet gear 25 for varying [the position of] crank arm 24. The radial adjustability of crank arm 24 is not shown in detail in this schematic illustration. Planet gear 25 is mounted in a web 26 which itself is mounted to be freely rotatable on shaft 8 so that planet gear 25 can roll along a fixed pole gear 27. A switchable coupling 28 can be used to fix web 26 to shaft 9, on which it rotates freely, so that the rotary motion of web 26 is transmitted directly to shaft 8. For rough-turning work, shaft 8 can be coupled to crank guide 22. This releases crank pin 24. If now the constant rotary motion of workpiece mount 1 is transmitted through back gear 6, 7 to crank guide 22, the latter also rotates at constant speed. The law of motion given by crank 24 of epicyclic gear 25, 26, 27 now causes shaft 8 to no longer rotate at uniform speed but to be subjected, during one revolution, to a change in speed corresponding to the law of motion given by the epicyclic gear so that tool 13, although it performs a circular movement, passes through the circle of its movement at correspondingly changing speeds during one revolution.

FIGS. 5, 6 and 7 are frontal views of the essential parts of the epicyclic crank guide drive. The individual elements of the drive can be easily identified by the reference numerals employed in FIG. 4. The gear setting shown in FIG. 4 corresponds to the frontal view of FIG. 6. As indicated in the drawing figures, crank pin 24 is held on planet gear 25 by means of roller 23 so as to be radially displaceable and fixable permitting the respectively desired law of motion to be set by way of the distance of crank pin 24 from the center of planet gear 25. FIG. 6 also explains the term "overlap position." Overlap position in the sense of the present invention is understood to mean the position in which crank guide 22 and web 26 are flush with one another, i.e. planet gear 25 takes on the position shown in dashed lines in FIG. 6. If the feed axis of the tool and axis 29 of the overlap position lie in one plane—it being assumed that both axes are parallel to one another—then, for example, with the appropriate matching of transmission ratio between rate of rotation of the workpiece and rate of rotation of the tool, eccentricity of the tool and length of crank arm 24, the polygonal contour shown in FIG. 9f results. By changing the eccentricity but leaving the other settings of the device unchanged, the polygonal contour shown in FIG. 9f results, which has sharp edges but inwardly curved or outwardly curved side faces, respectively, as this s shown for individual side faces in FIG. 9f.

If the feed axis and axis 29 of the overlap position are set at an angle to one another, then given basic setting for a hexagonal contour will result in the polygonal contour shown in FIG. 9h, which has asymmetrical side faces.

Instead of the straight-line contour shown in FIGS. 5, 6 nd 7 for crank guide 22, a crank guide contour having a guide path which is curved at least in certain zones may be provided for crank 24 and for roller 23, respectively. By giving crank guide 22 the appropriate contours, it is possible to influence the shape of the polygonal contour in the corner region as well as in the region of the side faces. Correspondingly, the path curves resulting from such a crank guide design for the center of roller 23 are also considered to be Pascal curves in the sense of the invention; this is also applicable if such curves form the basis for an electronic control. Further possibilities for variations result from FIG. 7 and also from FIG. 5. The variation according to FIG. 5 is shown in FIG. 8 in a corresponding top view. As can be seen from this top view, shaft 8 of carrier 9 for the tool holder, on the one hand, and drive shaft 30 for crank guide 22, on the other hand, are here arranged to be eccentric to one another.

The top view of FIG. 4 shows a further possible embodiment for the apparatus with which the mass moments of inertia can be substantially equalized. On the one hand, web 26 is provided with an equalizing mass 31 for this purpose, so that this part of the drive can here rotate without imbalance.

Additionally, a differential gear 32, here a planet gear drive, is connected with crank guide 22. In this case, crank guide 22 drives planet gear carrier 33. The sun gear 34 of the planet gear drive is connected with shaft 8 while countergear 35 is in engagement with planet gear 36, carries eccentric mass 37 and is mounted on shaft 8, or a separate shaft (not shown in detail here), so as to be freely rotatable.

FIG. 10 shows, in the form of a block circuit diagram, an apparatus in which the control for periodically changing the traveling speed of the tool is effected by electronic means. Here, drive 2 of the tool mount 1 is in communication with a rotation angle sensor 38. The output signal of rotation angle sensor 38, which gives the respective angular position of workpiece mount 1 and thus of the workpiece, is switched to a function generator 39.

In function generator 39, the Pascal curve required for the respectively desired polygonal contour is superposed on this signal by appropriate, known electronic means as is the desired speed ratio between workpiece and tool. The output signal of function generator 39 is switched as the desired value to a rectangular 40. Carrier 9 for tool 13 is itself connected with a drive motor 41 which generally rotates the support in the same sense as the tool. This drive motor 41 is also in communication with a rotation angle sensor 42 whose output signal indicates the respective angular position of carrier 9 and thus the position of tool 13. This output signal is switched to regulator 40 as the actual value.

From a comparison of the desired value with the actual value, regulator 40 obtains a regulating signal which is switched to a so-called electronic power system 43 of conventional design. Corresponding to this regulating signal, the number of revolutions of drive motor 41 is now controlled in such a manner that tool 13 travels at the desired, periodically changing traveling speed according to the given speed ratio and the given Pascal curve, as required to produce the given polygon. It is particularly advisable to employ stepping motors as the drive motors.

Such a device also permits discontinuous engagement of the tool or tools at the workpiece, as this is known, for example, in fly-cutting work. In the illustrated and described embodiments, the axis of rotation of the workpiece, on the one hand, and the axis of rotation of the tool, on the other hand, are oriented parallel to one another so that correspondingly cylindrical bodies having the desired polygonal cross sections can be produced. With the corresponding design of the back gear, however, it is also possible to arrange the axis of rotation of the tool movement at an angle with the axis of rotation of the workpiece so that, by correspondingly advancing the tool in the longitudinal direction of the workpiece, it is also possible to produce conical bodies having the corresponding polygonal cross section.

Since, as a result of the given laws of motion, the tool is constantly in engagement with the workpiece, the axis of rotation of the tool may also extend at 90° to the axis of rotation of the workpiece, so that in this way a polygonal contour can be worked into a frontal face of, for example, a cylindrical body.

In addition to stationary tools in the form of rotary chisels, rotating tools in the form of grinding elements or cutters or cutting heads can also be used as tools. In this case, a corresponding rotary drive, for example in the form of an electromotor, must be disposed on the tool holder. However, this does not pose major difficulties since, due to the translatory circular movement of the tool holder, no torque transmitters are required for supplying energy, be it electrical or hydraulic energy.

The invention is not limited to the illustrated and described drive arrangements but also includes wheel and/or crank drives with the aid of which Pascal curves can be produced so that, with the corresponding drive for the tool the respectively desired law of motion results. Pascal curves in the sense of the invention are also understood to mean asymmetrical curves as they are produced, for example, if the crank guide of the epicyclic gear does not have a linear guide contour but an at least partially curved outline.

The invention also includes a process or an arrangement, respectively, in which the rotation of the workpiece is replaced in that, in addition to its movement given by the law of motion, the tool as a whole revolves around the workpiece.

The use of the invention is not limited to the preferred machining work. It is also possible to guide tools for surface treatment of already finished workpieces having polygonal contours, for example a roller burnishing tool.

In addition to the stated differential drives, the equalization of mass moments of inertia can be effected by other structures which perform a movement in a direction opposite to the nonuniformity moved parts of the apparatus, for example hydraulically controlled mass systems.

FIG. 11 shows a further embodiment of a drive that cnan be controlled according to Pascal curves. However, compared to the drive shown and described in connection with FIG. 4, this drive has several structural simplifications with respect to guiding the tool as well as generating the Pascal curves. Insofar as components coincide with those of the embodiment shown in FIG. 4, the same reference numerals have been employed. Here again, the device includes a rotatably mounted workpiece mount 1 which is driven at a constant speed by means of a drive motor (not shown here in detail). A back gear (not shown here in detail) connects a shaft 44 with workpiece mount 1. Shaft 44 drives a tool holder 12 as well as gears 45 to generate the law of motion for tool 13. The entire arrangement is here mounted on a common carrier 46 in such a manner that the axis of rotation 47 of tool holder 12 is eccentric to the axis of rotation 48 of the tool, as shown in FIG. 14 with respect to tool mount 1. In FIG. 14, the polygonal profile to be generated is shown by its exterior delimiting circumcircle 49 and its inner delimiting incircle 50. Circumcircle 49 and incircle 50 are touched by the tool which is guided on a circular path 51 having the radius r. As can be seen in FIG. 14, the path 51 of the tool encloses the axis of rotation 48 of the tool mount and of the workpiece, respectively.

In comparison thereto, FIG. 13 shows the path 17 of the tool with respect to circumcircle 49 and incircle 50 of the profile to be generated. Here again, the tool which is guided on a circular path 17, touches circumcircle and incircle of the profile to be generated but lies between circumcircle and incircle without enclosing tool axis 48. Due to the translatory guidance, tool 13, which is symbolically indicated by an arrowhead, is oriented in the same direction in the guide according to FIG. 13 while in the embodiment according to FIG. 11, as shown in FIG. 14, the tool tip is always oriented toward the center of its axis of rotation 47. This is indicated in FIG. 14 by corresponding arrowheads.

As already described in detail above for other devices, the polygonal contour is generated in that tool 12, although traveling on a circular path, changes its speed during one revolution according to a defined law of motion. To generate polygonal profiles having practically any desired outlines and any desired number of corners, a drive which is controlled according to Pascal curves is particularly expedient. FIG. 11 shows a particularly compact embodiment. Drive 45 essentially comprises a crank guide 52 which drives a crank arm 54 by means of a slide block 53. Drive shaft 55 of crank arm 54 is mounted in a bearing bush 56 which itself is fastened to a rotatably mounted holder 57 which is designed in the form of a hollow shaft. Bearing bush 56 is fastened by way of a corresponding setting element 58 which makes it possible to set drive shaft 55 of crank arm 54 in an eccentric position with respect to axis of rotation 44 of crank guide 52. Correspondingly, drive shaft 55 is connected with drive shaft 8 of the tool holder by means of an articulated shaft 59.

Holder 57 is driven by means of a toothed gear drive which is in communication with shaft 8 and which is designed so that holder 57 rotates in the same sense as shaft 8, but at a greater speed. In the illustrated embodiment, this drive 8 is indicated by the two pairs of gears 60. A transmission ratio of 1:2 is preferably selected here. In addition to the eccentricity $e_2$ between driven shaft 55 and drive shaft 44, which can be set by means of setting element 58, a further setting element 61 is provided with which the length of crank arm 54 can be varied. Setting elements 58, 61 serve to change the respectively desired Pascal curve, while setting device 46, which changes the entire arrangement with respect to the axis of rotation 48 of the workpiece by the amount $e_1$ and adjustment device 62, which serves to set the radius r for the path of the tool, serve to associate the tool with the circumcircle and the incircle of the profile to be generated. The entire arrangement is here also axially displaceable with respect to the workpiece so that correspondingly profiled cylinders can be produced. The crank guide can here be adjusted independently by means of setting means 46 so as to further vary the Pascal curves.

FIG. 12 shows a modification of the above-described gear mechanism which makes it possible to give an ellipse as the law of motion for the change in the travel speed of tool 13, i.e., to utilize the travel speed of a point which traverses a given elliptical path at an essentially constant angular velocity to control the traveling speed of the tool.

The configuration of this gear mechanism corresponds essentially to the gear mechanism 45 described in connection with FIG. 11, so that identical components are here given the same reference numerals. Here again, the entire shaft arrangement is held in a frame which is provided with an adjustment device 46 with respect to the axis of rotation 48 of workpiece mount 1 for setting the eccentricity $e_1$.

In this gear mechanism as well, a shaft 44, which is in communication by way of a back gear (not shown) with the drive for tool mount 1—so that workpiece mount 1 and shaft 44 move together—is connected with a crank guide 52 in which the slide ring 53 of a crank arm 54 is mounted. Drive shaft 55 of crank arm 54 is mounted in a bearing bush 56 which is held by means of a setting element at a rotatably mounted holder 57 which is designed as a hollow shaft.

Drive shaft 55 is further connected with an articulated shaft 59 which, however, drives two gear arrangements. On the one hand, holder 57 of bearing bush 56 for drive shaft 55 is driven by means of a bevel gear drive 63 and this in such a manner that this holder rotates at the same speed but in the opposite sense of rotation as drive shaft 55.

Articulated shaft 59 further drives a step-up gear composed of two pairs of gears 64, 65 with the driving gear of the pair of gears 64 being rigidly connected with the driving gear of bevel gear drive 63. The driven gear of gear pair 65 is here fixedly coupled with shaft 8 so that shaft 8 rotates at a correspondingly higher speed than drive shaft 55.

The length of crank arm R can again be varied by means of setting elements 61, while, as already described above, setting element 58 serves to set the eccentricity $e_2$ between drive shaft 55 and shaft 44. Setting means 46a provides additional eccentricity.

In all described gear mechanisms, tool 13 is guided on a circular path, with the speed ratio being set according to the given polygonal contour, as will be described in greater detail below, but, during one revolution, tool 13 does not travel this circular path at a constant traveling speed but at a traveling speed which changes according to a law of motion as given by the setting of the gear mechanism. The gear mechanisms according to arrangements 4 and 11 make it possible to give the law of motion according to Pascal curves so that here polygonal curves having straight sides and sharply defined corners can also be produced. The gear arrangement according to FIG. 12, which gives the law of motion according to an elliptical path, makes it possible to produce polygonal contours which have rounded corners and curved sides.

If the tool is guided according to FIG. 13, the number of corners of the polygonal profile to be produced results from the given speed ratio between the workpiece speed $n_1$ and the tool speed $n_2$ in that $E=n_2/n_1$. The speed ratio is not a whole number, profiles may result which are twisted in the manner of a helix in the longitudinal direction of the workpiece.

With tool guidance according to FIG. 14, the number of corners is determined from the difference between the number of revolutions of the workpiece and of the tool, thus the following applies for the number of corners:

$$E=1/[(n_2/n_2)-(n_1/n_2)]$$

In the gear arrangements according to FIGS. 11 and 12 as well, the equalization of imbalances and mass moments of inertia can be effected with the aid of the means described in connection with FIG. 4.

The gear mechanisms according to FIGS. 11 and 12 may also be used in such a manner that the drive is provided by means of shaft 8 while the tool carrier 12 is connected with shaft 44. This produces the polygonal contours according to FIGS. 9a, 9b and 9c.

Since the polygonal contour to be produced is the result of the superposition of rotary movements of workpiece and tool, it is of course also possible to make an arrangement so that the illustrated gear mechanisms for generating the law of motion drive workpiece mount 1 while tool 13 itself rotates at a constant traveling speed. It is further possible to modify the method according to the invention in such a way that superpositiory gear mechanisms designed according to the invention are connected in series, i.e., the rotation of the workpiece is additionally transferred to the tool by means of an additional gear mechanism so that it becomes possible to apply corresponding polygonal contours even to stationary workpieces. This is of advantage, for example, if such polygonal contours are to be applied, for example, in the form of corresponding recesses, when the shape and/or size of the workpiece do not permit rotation of the workpiece itself.

In gear arrangements according to FIGS. 11 and 12, it is also possible, as described in connection with FIGS. 5, 6 and 7, to shift the feed axis and the overlap position so as to produce asymmetrical polygonal contours since, corresponding to the mathematically given law of motion based on Pascal curves, the web 26 shown in FIG. 5 corresponds to crank 54 in the gear mechanism of FIG. 11.

The method for illustrating the law of motion can also be described according to the formulations of claim 5 and claim 8 or 9, respectively, for epicycloids, for example Pascal curves, in that the traveling speed of the tool during one revolution is changed according to a law of motion which corresponds to the angular velocity of a guide indicator proportional to the desired number of corners with the guide indicator being geometrically added to a likewise rotating lead indicator. The origin is stationary and the lead indicator rotates in the same sense as the guide indicator at a higher angular velocity and the end point of the geometric addition describes an epicycloid. Moreover, the end point of this addition is guided by a drive indicator which rotates at a preferably constant angular velocity.

For hypocycloids, for example ellipses, it then correspondingly applies that the traveling speed of the tool during one revolution is changed according to a law of motion which corresponds to the angular velocity of a guide indicator proportional to the desired number of corners, with the guide indicator being geometrically added to a lead indicator. The origin is stationary and the lead indicator rotates in the opposite sense at at least the same angular velocity as the guide indicator, while the end point of the geometric addition describes a hypocycloid. The end point of the addition is guided by a drive indicator which rotates at a preferably constant angular velocity.

In both cases, the traveling speed of the tool is determined by the angular velocity of the axis of rotation of the guide indicator.

If the indicator arrangement is reversed, i.e. if the drive indicator becomes the guide indicator and the guide indicator becomes the drive indicator, the superposition of workpiece movement and tool movement also produces polygonal contours.

We claim:

1. Method for shaping a workpiece to produce a polygonal outer and/or inner contour, comprising: rotating the workpiece at a constant speed about a first stationary axis of rotation; displacing a shaping tool cyclically on a closed circular path about a second axis of rotation spaced from the first stationary axis of rotation so that the closed circular path is eccentric to the stationary axis of rotation; causing the rate of rotation of the workpiece and the speed at which the tool is displaced on its circular path to be dependent upon one another; causing the tool to engage the workpiece over at least a portion of the path of displacement of the tool so that the workpiece is shaped by superposition of the rotational movement of the workpiece and the displacement of the tool on its closed circular path; and varying the displacement speed of the tool during each displacement cycle according to a law of motion determined by the desired polygonal contour, by the action of movement control means controlling the speed of displacement of the tool according to the law of motion.

2. Method according to claim 1, characterized in that the polygonal contour is delimited by a circumcircle and an incircle and the tool has a point of engagement with the workpiece, which point is guided essentially translatorily on a circular path which is eccentric to the axis of rotation of the workpiece and is limited by the circumcircle and incircle.

3. Method according to claim 1, characterized in that the polygonal contour is delimited by a circumcircle and an incircle and the tool has a point of engagement with the workpiece, which point is guided to revolve on a circular path which lies eccentric to the axis of rotation of the workpiece, encircles the workpiece and is tangent to both the circumcircle and the incircle.

4. Method according to claim 1 characterized in that the tool is guided on a circularly cylindrical path.

5. Method according to claim 1, characterized in that the law of motion for the traveling speed of the tool during each displacement cycle is defined by the changing angular velocity of the center point of a circle which, without sliding, rolls along the outside of a stationary circle having the same diameter, with the angular velocity referring to the center point of the stationary circle, a second point, which is fixedly associated with the revolving circle and which performs a Pascal curve during the revolution of the rolling circle being guided at essentially constant angular velocity about a center of rotation lying within the Pascal curve.

6. Method according to claim 5, characterized in that the change in the traveling speed of the tool during each displacement cycle on its path is effected by means of a mechanical epicyclic crank guide gear mechanism which is controllable according to Pascal curves, and an asymmetrical polygonal contour is produced in that the feed axis of the movement of the tool and the overlap position of the crank guide of the epicyclic gear are set at an angle to one another.

7. Method according to claim 1, characterized in that the traveling speed of the tool during each displacement cycle is varied according to a law of motion which corresponds to the angular velocity of the axis of rotation of a crank arm, said axis itself rotating on a circular path at a greater angular velocity but in the same direction of rotation, with the angular velocity of the revolution of the axis of rotation on the circular path depending on the angular velocity of the revolution of the axis of rotation itself and the crank pin is driven by a crank guide which rotates at a constant angular velocity, the axis of rotation of said crank guide coinciding with the axis of rotation of the circular path of the axis of rotation of the crank arm or being shifted radially with respect thereto.

8. Method according to claim 1, characterized in that the law of motion for changing the traveling speed of the tool during each displacement cycle is varied according to a law of motion which corresponds to a whole number multiple of the angular velocity of the axis of rotation of a crank arm which itself revolves on a circular path at the same angular velocity but in the opposite direction of rotation, with the angular velocity of the revolution of the axis of rotation on the circular path depending on the angular velocity of the revolution of the axis of rotation itself and the crank pin is driven by a crank guide which revolves at constant angular velocity, the axis of rotation of said crank guide coinciding with the axis of rotation of the circular path of the axis of rotation of the crank arm or being radially shifted with respect thereto.

9. Method according to claim 8, characterized in that the traveling speed of the tool on its path during each displacement cycle is varied by means of a gear mechanism that is controllable according to ellipses.

10. Apparatus for shaping a workpiece to have a polygonal outer and/or inner contour, comprising: a rotatably mounted workpiece mount for supporting the workpiece, workpiece drive means connected to said mount for rotating said mount, and thus the workpiece, about a stationary first axis; a tool; a tool carrier supporting said tool for displacing said tool cyclically on a closed circular path about a second axis spaced from the first axis; and tool drive means coupled to said tool carrier for moving said tool carrier in order to displace said tool along its closed circular path at a speed which varies during each displacement cycle according to a control function for the polygonal contour to be produced, which control function corresponds to a law of motion.

11. Apparatus as defined in claim 10 wherein said drive means comprise: electronic circuit means connected to said workpiece supporting means and said tool supporting means for receiving a representation of the actual speed of rotation of the workpiece and for controlling said tool supporting means for moving the tool at a desired speed which is dependent on the workpiece rotation rate and which varies according to the selected law of motion.

12. Apparatus as defined in claim 10 wherein said electronic circuit means comprise: first monitoring means connected for monitoring the actual rate of rotation of the workpiece and for producing a first electrical monitoring signal representative of the actual rate of rotation of the workpiece; electronic function generating means connected to receive the first electrical monitoring signal for producing a control signal representing the desired speed of movement of the tool as a function of the rate of rotation of the workpiece; second monitoring means connected for monitoring the actual speed of movement of the tool and for producing a second electrical monitoring signal representative of the actual speed of movement of the tool; and electronic control means connected to receive the control signal and the second electrical monitoring signal for producing a tool speed control signal and for supplying the tool speed control signal to said tool supporting means for moving the tool at the desired speed.

13. Apparatus according to claim 10, characterized in that, for equalizing the mass moments of inertia generated by the changing traveling speed of the tool during one revolution, the drive means (21) is connected with a differential gear mechanism (32) which drives a centrifugal mass (37).

14. Apparatus according to claim 13, characterized in that the differential gear mechanism (32) for driving the centrifugal mass (37) is a planet gear with the crank guide (22) driving the planet gear carrier (33), the sun gear (34) being connected with the shaft (8) of the carrier (9) for the tool holder (12) and the counterwheel (35) which is in engagement with the planet gear (36) is mounted coaxially with the sun gear (34) and carries the centrifugal mass (37).

15. Apparatus according to claim 10 wherein said tool carrier supports said tool for translatory movement over the circular path and comprises a rotatable member rotated by said tool drive means and a bearing block coupling said rotatable member to said tool, said bearing block having a single axis of rotation which is eccentric to the axis of rotation of said rotatable member, and said tool carrier further comprises a moment transmitting support supporting said tool relative to a fixed location.

16. Apparatus according to claim 15, characterized in that the moment transmitting support (14) forms a crank drive.

17. Apparatus according to claim 15, characterized in that the moment transmitting support (14) is a pivot arm with linear guidance (19).

18. Apparatus according to claim 10 wherein said workpiece drive means comprise a motor and said tool drive means comprise a drive which is driven by said motor and is controllable according to ellipses.

19. Apparatus according to claim 18, characterized in that the gear mechanism which is controllable according to ellipses is constituted by a revolving crank guide (52), with the crank guide (52) constituting the driving part of the gear mechanism and the crank (54) constituting the driven part; the driven shaft (55) of the crank (54) is mounted in a bearing bush (56) which is arranged eccentric to the axis of rotation of said crank guide (52) and rotates in the opposite direction, the bearing bush (56) is connected with the driven shaft (55) of the crank (54) by means of a drive mechanism (63) for reversing the direction of rotation and, by means of a step-up gear mechanism (64, 65), the driven shaft (55) is simultaneously in communication, by means of a step-up gear mechanism (64, 65) with a rotatably mounted tool carrier (12).

20. Apparatus according to claim 10 wherein said tool drive means are connected to be driven by said workpiece drive means and comprise a mechanism which is controlled according to Pascal curves.

21. Apparatus according to claim 20 wherein said tool carrier comprises a shaft mounted for rotation about a third axis, and said mechanism comprises an epicyclic gear composed of: a crank guide, a planet gear, a crank pin connecting said crank guide to said planet gear; and a planet gear web supporting said planet gear and mounted for rotation about the third axis, and wherein said mechanism is composed of a driving part which includes said crank guide, and a driven part which includes said web and is driven by said driving part.

22. Apparatus according to claim 21 wherein said tool carrier is displaceable in a feed direction toward the workpiece, said mechanism is movable into an overlap position, in which said crank guide is aligned with said web, and said tool carrier is adjustable for establishing a selected angular relation between said feed direction and the orientation of said crank guide in the overlap position.

23. Apparatus according to claim 21 wherein said mechanism further comprises: means supporting said crank guide for rotational movement about an axis; and a coupling for separating said carrier from said web and connecting said carrier for rotation with said crank guide.

24. Apparatus according to claim 21 wherein said epicyclic gear further has a pole gear coupled to said planet gear and additionally driven in dependence on movement of said tool.

25. Apparatus according to claim 21, characterized in that the axis of rotation (30) of the crank guide (22) can be set to be eccentric to the axis of rotation (8) of the web (26).

26. Apparatus according to claim 21, characterized in that the crank pin (24) associated with the planet gear (25) is designed to be displaceable and fixable with respect to the planet gear (25).

27. Apparatus according to claim 21, characterized in that the axis of rotation (8) of the carrier (9) for the tool can be set at an angle with the axis of rotation of the workpiece mount (1).

28. Apparatus according to claim 21, characterized in that the mechanism which is controllable according to Pascal curves is formed by a revolving crank guide, with the crank guide constituting the driving part of the mechanism and the crank constituting the driven part; the drive shaft (55) of the crank (54) is mounted in a bearing bush (56) which is arranged eccentric to the axis of rotation (44) of the crank guide (52) and revolves in the same sense of rotation; the bearing bush (56) is connected with the driven shaft (55) of the crank (54) by means of a step-up gear mechanism (45) and the driven shaft (55) is in communication with the rotatably mounted tool carriers (12).

* * * * *